United States Patent
Kotagiri et al.

(10) Patent No.: US 9,306,775 B1
(45) Date of Patent: Apr. 5, 2016

(54) ADAPTATION OF GAIN OF BASELINE WANDER SIGNAL

(71) Applicant: Avago Technologies General IP (Singapore) Pte. Ltd., Singapore (SG)

(72) Inventors: Shiva Prasad Kotagiri, Campbell, CA (US); Amaresh V. Malipatil, San Jose, CA (US)

(73) Assignee: Avago Technologies General IP (Singapore) Pte. Ltd.

( * ) Notice: Subject to any disclaimer, the term of this patent is extended or adjusted under 35 U.S.C. 154(b) by 0 days.

(21) Appl. No.: 14/484,209

(22) Filed: Sep. 11, 2014

(51) Int. Cl.
*H03H 7/30* (2006.01)
*H04L 25/03* (2006.01)

(52) U.S. Cl.
CPC .................................. *H04L 25/03019* (2013.01)

(58) Field of Classification Search
CPC ............ H04L 27/10; H04L 2025/0349; H04L 25/0284; H04L 1/0047; H04L 25/03019; H04L 1/007; H04L 1/0061; H03M 13/09; H04B 15/00

USPC .................................. 375/232, 229, 230, 233
See application file for complete search history.

(56) References Cited

U.S. PATENT DOCUMENTS

| | | | |
|---|---|---|---|
| 7,961,817 B2 | 6/2011 | Dong et al. | |
| 8,095,710 B2 | 1/2012 | Landry et al. | |
| 2003/0031126 A1 | 2/2003 | Mayweather et al. | |
| 2008/0063091 A1* | 3/2008 | Dong et al. .................. | 375/257 |
| 2011/0029701 A1 | 2/2011 | Murray et al. | |
| 2011/0296269 A1* | 12/2011 | Tsai ............................. | 714/752 |
| 2012/0155528 A1* | 6/2012 | Zhong .......................... | 375/232 |
| 2013/0104012 A1 | 4/2013 | Barner | |
| 2014/0229751 A1 | 8/2014 | Manav et al. | |

* cited by examiner

*Primary Examiner* — Dhaval Patel (57) ABSTRACT

A receiver disposed in a serializer/deserializer (SerDes) system includes a coupling capacitor configured to receive a serial input signal from a transmitter operatively coupled with the receiver via a communication channel established therebetween and to output a capacitance output signal, an equalizer configured to receive a signal including the capacitance output signal having a baseline wander gain subtracted therefrom, a running disparity generator receiving decoded symbols and generating a running disparity signal, and a low-pass filter receiving the running disparity signal and outputting the BLW gain.

20 Claims, 8 Drawing Sheets

ADAPTATION OF GAIN OF BASELINE WANDER SIGNAL

FIELD OF INVENTION

The present invention relates generally to electrical and electronic circuitry, and more particularly relates to data communications.

BACKGROUND

In Serializer/Deserializer (SerDes) systems, on-chip AC (alternating current) capacitance is typically used to mitigate mismatches in differential signaling. This on-chip AC capacitance, or board capacitance, introduces distortion into the incoming signal at a receiver, which causes a baseline of the incoming signal to wander slowly. This impact can be viewed as a high-pass filtering of the incoming signal. The difference between the input to and the output of AC capacitance is called a baseline wander (BLW) signal.

The BLW signal can be viewed as a slowly varying voltage offset. To mitigate the effect of BLW on the incoming signal, a correction signal can be generated locally at the receiver and subtracted from the signal after on-chip AC capacitance or board capacitance. To generate such a BLW correction signal, a running disparity of decoded bits is passed through a low-pass filter whose cut-off frequency is the same as a cut-off frequency of the high-pass filtering because of AC capacitance and the output of low-pass filter is multiplied by the direct current (dc) gain of the system up to the receiver input. This BLW gain is approximately equal to the dc gain of the system up to the receiver input; i.e., the product of channel dc gain and transmitter (TX) dc gain. The strength of the BLW signal depends on the amount of disparity between 1's and 0's in the pattern and dc gain of the system up to the receiver input. When applications using the SerDes system recommend patterns that do not have sufficient randomness (e.g., patterns with a large running disparity of 1's and 0's), then there is a degradation in the performance of the SerDes system without BLW correction at the receiver. To avoid the degradation of performance, the correction of BLW distortion needs to be compensated at the receiver.

To estimate the dc gain at the receiver, digital least means square (LMS) gradients can be used based on minimum mean squared error between correction signal and BLW signal. This requires sampling of the incoming signal at the receiver front end. Because of the implementation constraints, obtaining such incoming signal sample at the receiver input is difficult. Approximations to avoid the use of such incoming signal samples in the gradient calculation are sub-optimal and have impact on the performance of SerDes system. The BLW gain is manually set to avoid all these problems in typical SerDes cores. Such manual setting is also difficult because TX dc gain and channel dc gain are not known in advance.

SUMMARY

In accordance with one or more embodiments of the present invention, a receiver disposed in a serializer/deserializer (SerDes) system includes a coupling capacitor configured to receive a serial input signal from a transmitter operatively coupled with the receiver via a communication channel established therebetween and to output a capacitance output signal, an equalizer configured to receive a signal, wherein the signal is the capacitance output signal having a baseline wander (BLW) gain subtracted therefrom, a running disparity generator receiving decoded symbols and generating a running disparity signal, and a low pass filter receiving the running disparity signal and outputting the baseline wander (BLW) gain. Additional and/or other embodiments of the invention are described in the following written description, including the claims, which is to be read in connection with the accompanying drawings.

BRIEF DESCRIPTION OF THE FIGURES

The following drawings are presented by way of example only and without limitation, wherein like reference numerals (when used) indicate corresponding elements throughout the several views, and wherein.

It is to be appreciated that the drawings described herein are presented for illustrative purposes only. Moreover, common but well-understood elements and/or features that may be useful or necessary in a commercially feasible embodiment may not be shown in order to facilitate a less hindered view of the illustrated embodiments.

WRITTEN DESCRIPTION

Embodiments of the invention will be described herein in the context of a receiver and method of adaptation of baseline wander (BLW) gain which uses a metric to mitigate or remove the effect of BLW signal on an incoming signal to a receiver. It should be understood, however, that embodiments of the invention are not limited to these or any other particular apparatus or methods. Rather, it will become apparent to those skilled in the art given the teachings herein that numerous modifications can be made to the illustrative embodiments shown that are within the scope of the claimed invention. That is, no limitations with respect to the embodiments shown and described herein are intended or should be inferred.

As a preliminary matter, for purposes of clarifying and describing embodiments of the invention, the following table provides a summary of certain acronyms and their corresponding definitions, as the terms are used herein:

Table of Acronym Definitions

| Acronym | Definition |
| --- | --- |
| SerDes | Serializer/Deserializer |
| BLW | Baseline wander |
| TX | Transmitter |
| LMS | Least means square |
| RX | Receiver |
| DFE | Decision feedback equalizer |
| AFE | Analog front end |
| MSE | Mean squared error |

Figure 1:
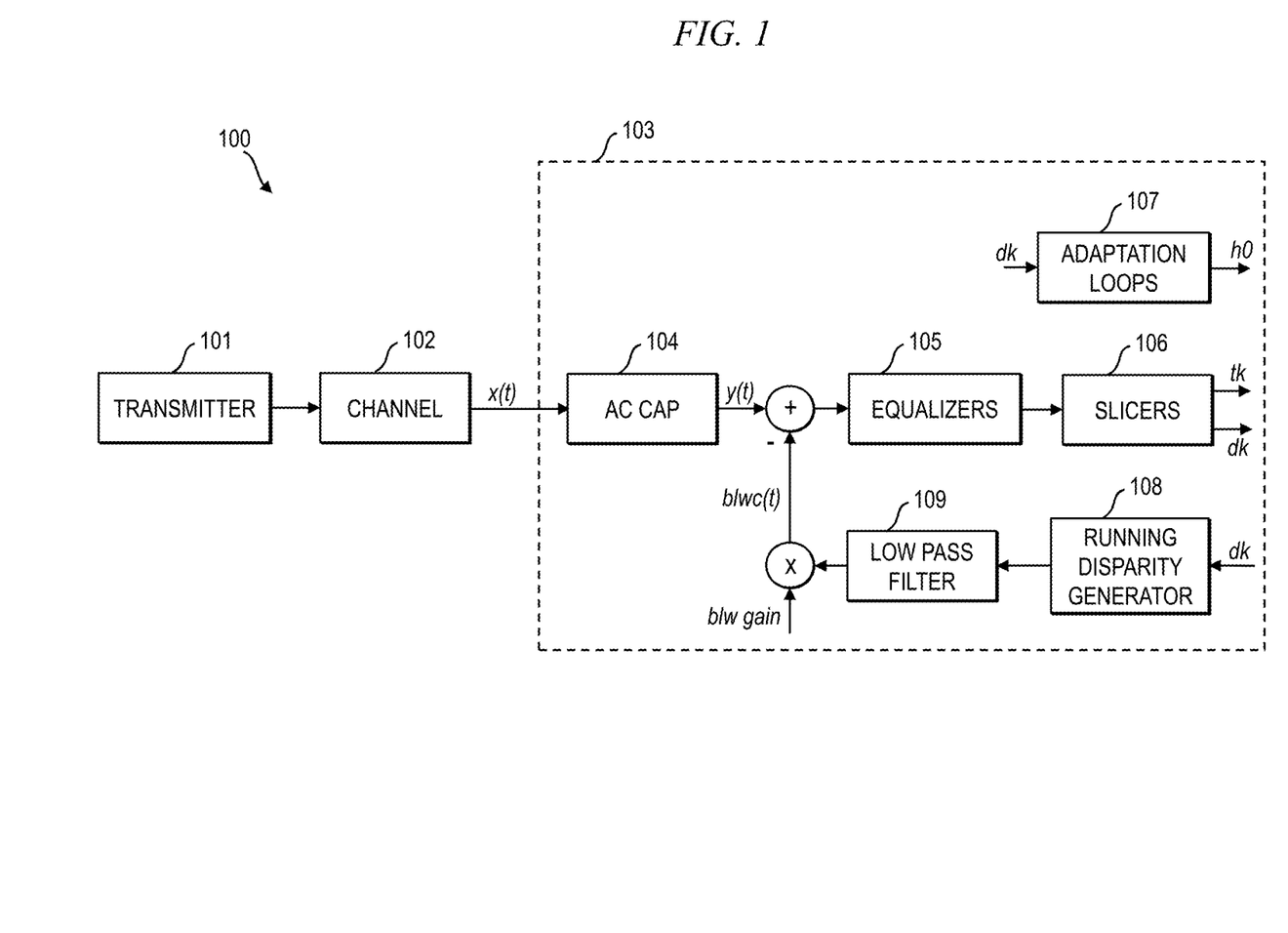
FIG. 1 depicts a system for adaptation of BLW gain in accordance with one or more embodiments of the present invention.

FIG. 1 shows a block diagram of a serializer/deserializer (SerDes) system 100 including a transmitter (TX) 101, channel 102 and receiver (RX) 103. In SerDes systems, on-chip AC coupling capacitance 104 causes a high pass filtering of the received signal. As shown in FIG. 1, on-chip AC coupling capacitance 104 (e.g., functioning as a coupling capacitor) is disposed at the front end of the receiver 103. Typically, the corner of this high pass filter is low compared to the frequency of received signals because of a large AC capacitance value. This high pass filtering causes the base of a signal to wander and results in reduction in received voltage on positive side or negative side. This impact can be mathematically viewed as adding a slowly varying signal blw(t)(=y(t)−x(t)) to the input signal x(t). This slowly varying signal is the BLW signal whose strength is dependent on the running disparity of 1's and 0's, and the dc gain (or low-frequency) of the channel 102 and transmitter 101. If the input bit stream is not scrambled data then the running disparity is high. If the running disparity is high or the transmitter dc gain is large, the strength of BLW is high. In such cases, the input signal's base is shifted down or up resulting in a degradation of performance.

The receiver 103 further includes an equalizer block 105, slicer block 106 and adaptation loop block 107. The equalizer block 105 can be, for example, a linear equalizer or a decision feedback equalizer (DFE), which can be used to remove the impacts of distortions in the channel. The slicer block 106 quantizes the equalized signal (output by the equalizer block 105) to 1's and 0's. More particularly, the slicer block 106 samples the output of the equalizer block 105 using a clock signal (Rx clock, see FIG. 3) so that the output of the equalizer block 105 is re-timed (or "quantized") according to the clock timing of the receiver 103. The slicer block 106 also outputs transition samples tk as sampled values of the receiver front end output y(t) at the transitions. The adaptation loop block 107 outputs a target value h0 for the front end output.

Figure 2:
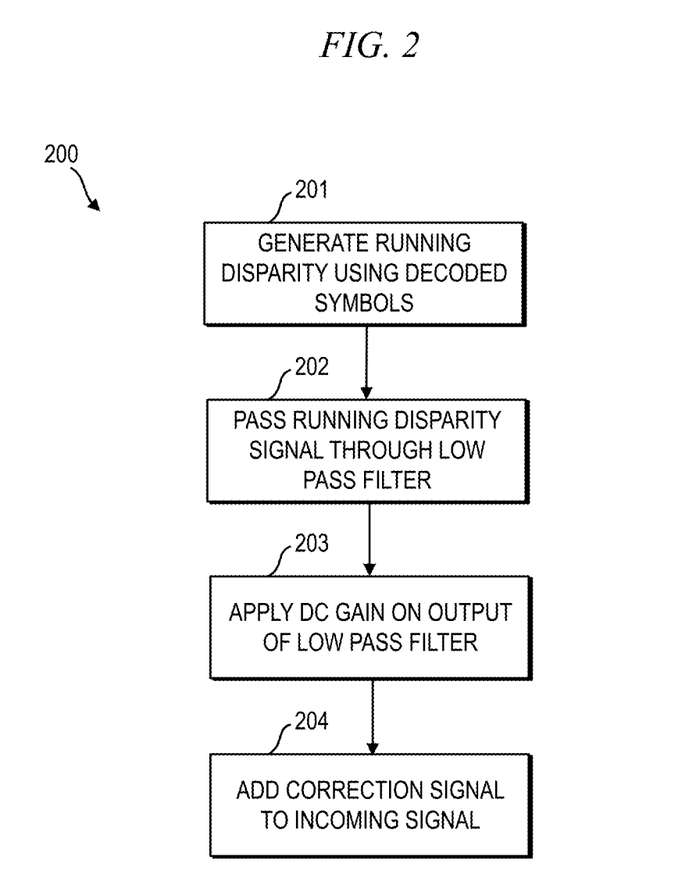
FIG. 2 illustrates a method for adaptation of BLW gain accordance with one or more embodiments of the present invention.
Figure 3:
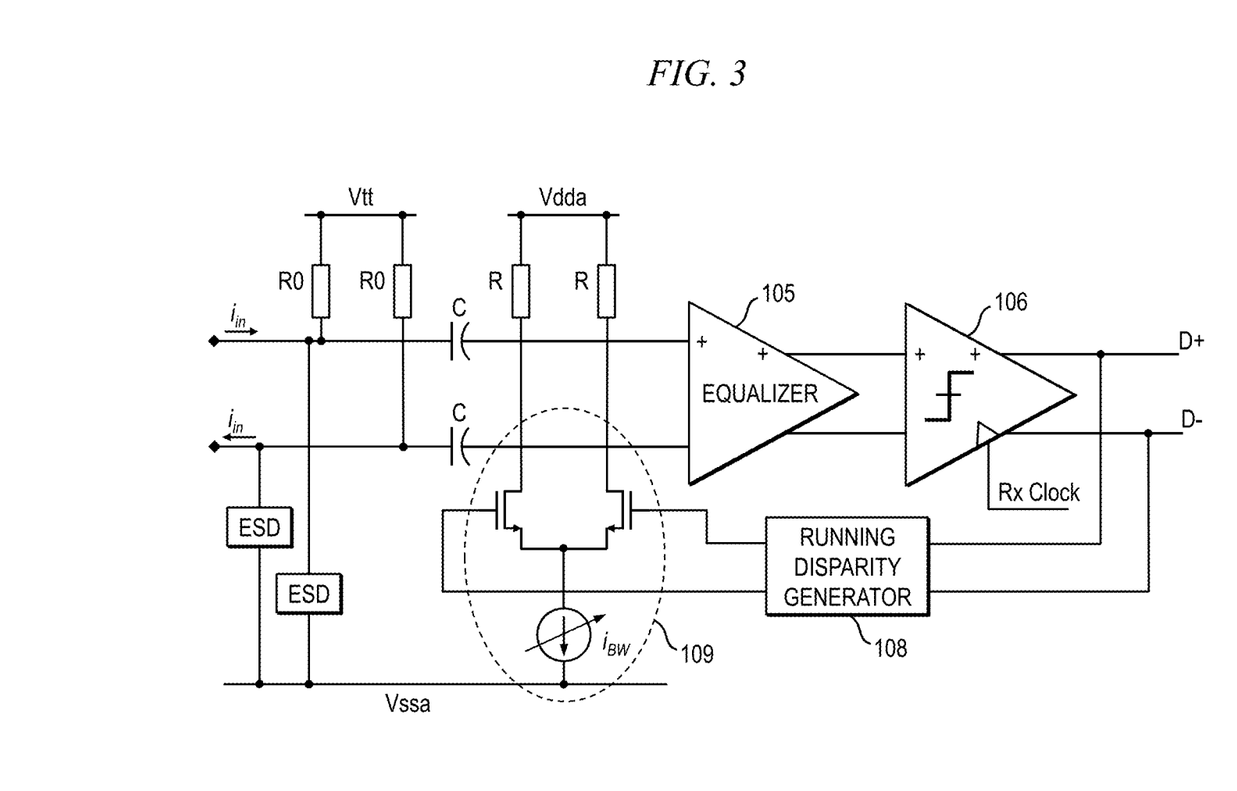
FIG. 3 is a circuit diagram for adaptation of BLW gain in accordance with one or more embodiments of the present invention.

According to one or more exemplary embodiments of the present invention, a signal is created using decoded symbols and a dc gain of the system up to the receiver input, and this signal is subtracted from the AC capacitance output y(t). FIG. 2 shows a flow diagram of an exemplary method to generate the BLW correction signal locally in the receiver. At block 201, a running disparity of 1's and 0's is generated using the decoded symbols in the receiver. At block 202, the running disparity signal is passed through a low-pass filter whose cut-off frequency is equal to that of the high-pass filter due to on-chip AC capacitance. At block 203, the dc gain of system up to the receiver input is applied on the output of low-pass filter. Once the correction signal is generated, it can be added to the incoming signal so that the effect of BLW on the incoming signal is removed at block 204. FIG. 3 shows a circuit diagram implementing the method of FIG. 2 to remove the effect of BLW on the incoming signal at the receiver front end (i.e., analog front end (AFE)) by using decoded symbols and on-chip capacitance in the analog domain.

Figure 4:
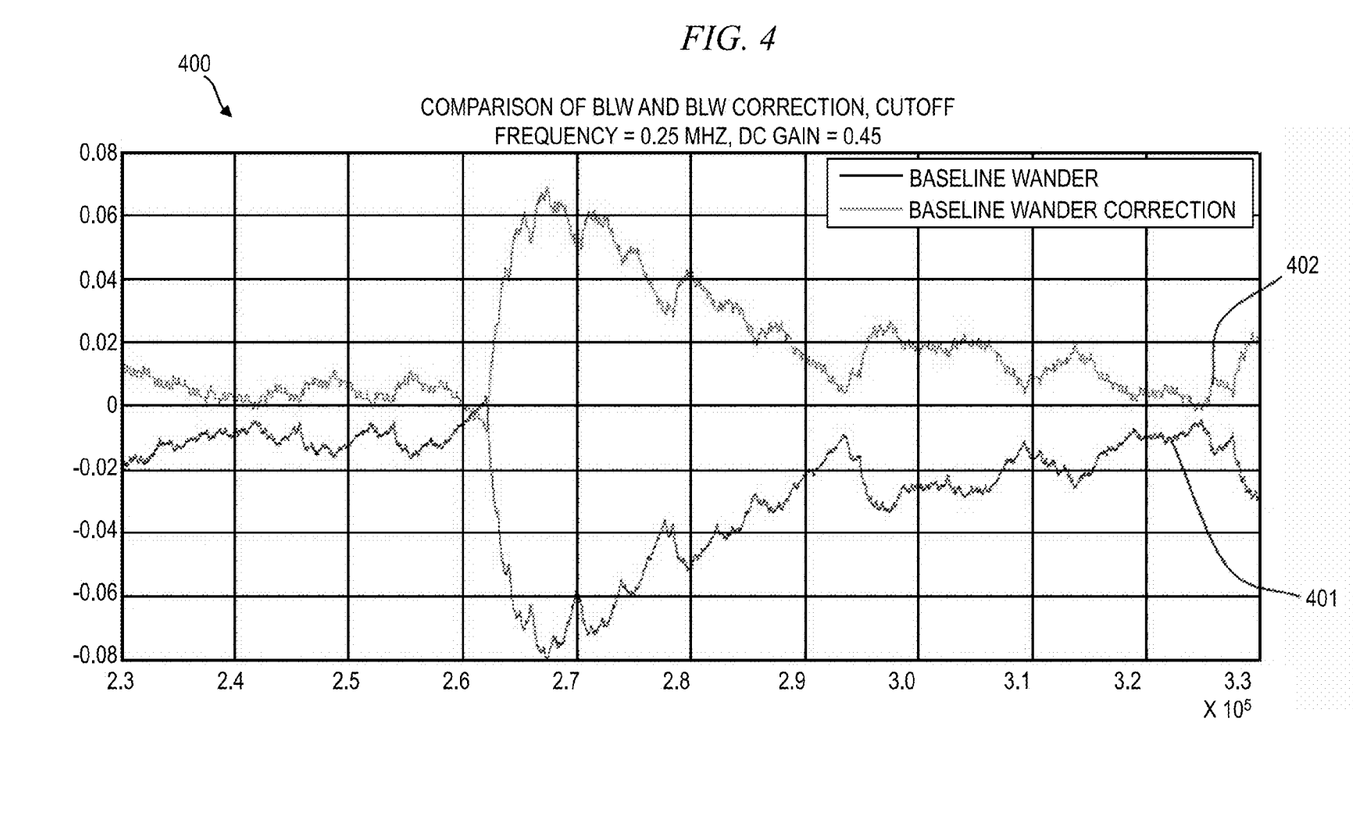
FIG. 4 illustrates a BLW signal and a BLW correction signal in accordance with one or more embodiments of the present invention.
Figure 5:
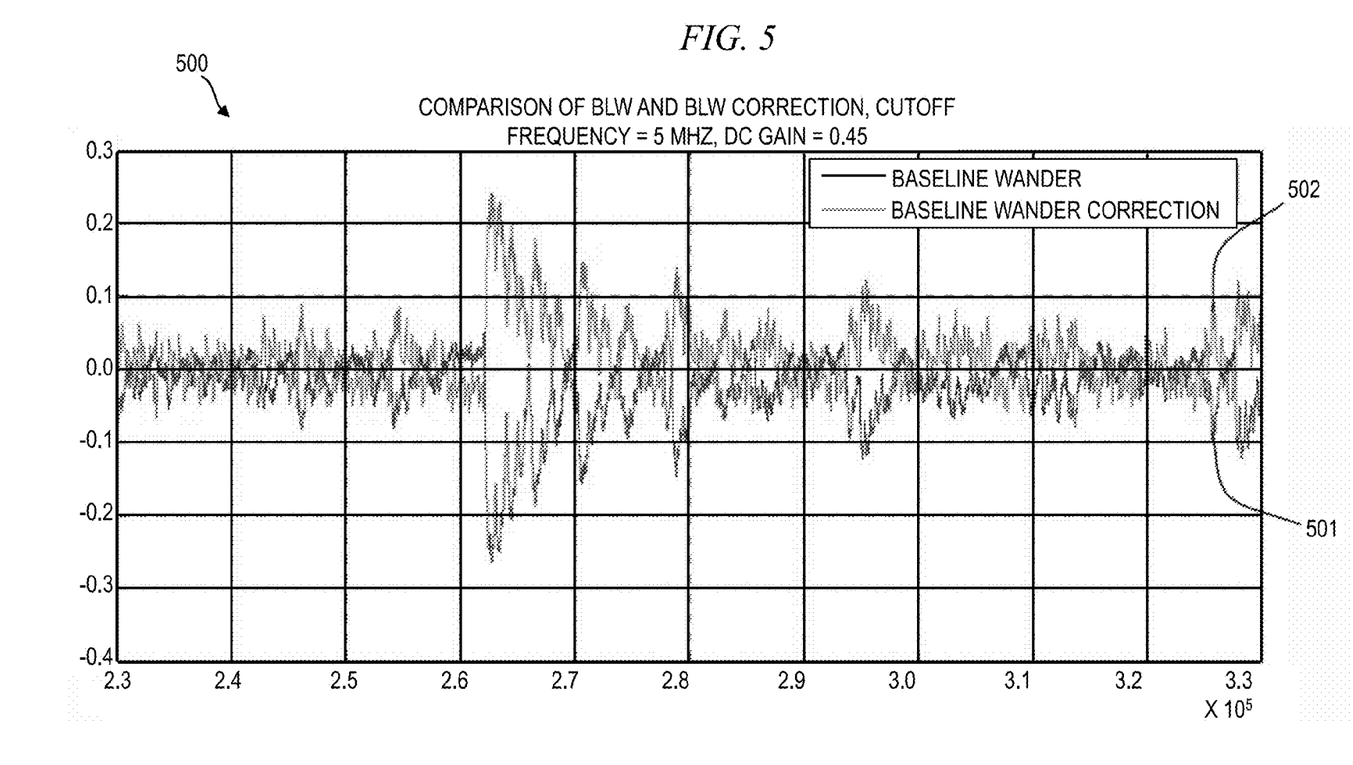
FIG. 5 illustrates a BLW signal and a BLW correction signal in accordance with one or more embodiments of the present invention.

With reference to FIG. 2, the generation of the running disparity is accomplished using the decoded symbols as in FIG. 3. The running disparity signal is passed through the low pass filter using on-chip AC capacitance. As shown in FIG. 3, there is no information of dc gain up to a receiver input at the receiver. Examples of BLW signal and BLW correction signal given BLW gain are shown in FIG. 4 (graph 400) and FIG. 5 (graph 500) with cut-off frequency of 250 KHz and 500 KHz, respectively. Signal 401/501 is the BLW signal and signal 402/502 is the correction signal. The correction signal is generated by using an implementation of the method shown in FIG. 2, assuming that the BLW gain is known.

Denoting the running disparity as rd(t) and BLW gain as g, the values of g can be picked such that mean squared error (MSE) between blw(t) and g*rd(t) is minimized. For such MSE metric, a digital LMS gradient requires the incoming signal x(t) of AC capacitance to be sampled. To obtain such incoming signal samples, slicers 106 need to be placed before the AC capacitance block 104 shown in FIG. 1. Given space constraints and implementation complexity, it is difficult to have slicers at the receiver front end.

Figure 6:
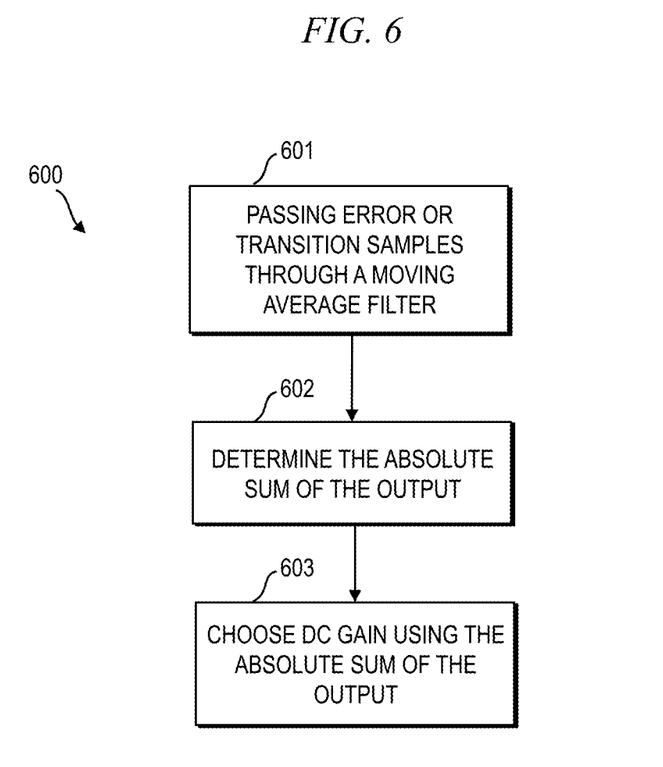
FIG. 6 depicts a method for obtaining the dc gain of the system up to receiver input in accordance with one or more embodiments of the present invention.

According to one or more exemplary embodiments of the present invention, a metric is used to obtain the dc gain of the system up to the receiver input. Referring to FIG. 6, the metric 600 includes passing error or transition samples through a moving average filter at block 601 and taking an absolute sum of the output at block 602. The absolute sum of the moving average filter is used as a metric for choosing dc gain in the receiver at block 603. In FIG. 6, the error and transition samples are already derived for decision feedback equalizer tap adaptation and clock-data recovery. The error sample is given as ek=yk−h0, where yk is an equalized sample at the receiver output y(t) and h0 is a target value which is a mean or median of yk when the sign of yk=1 or yk=−1. The transition sample tk is sampled values of receiver output y(t) at the transitions. It is assumed that the BLW gain g is between $g_{min}$ and $g_{max}$ in steps of $g_{res}$.

Figure 7:
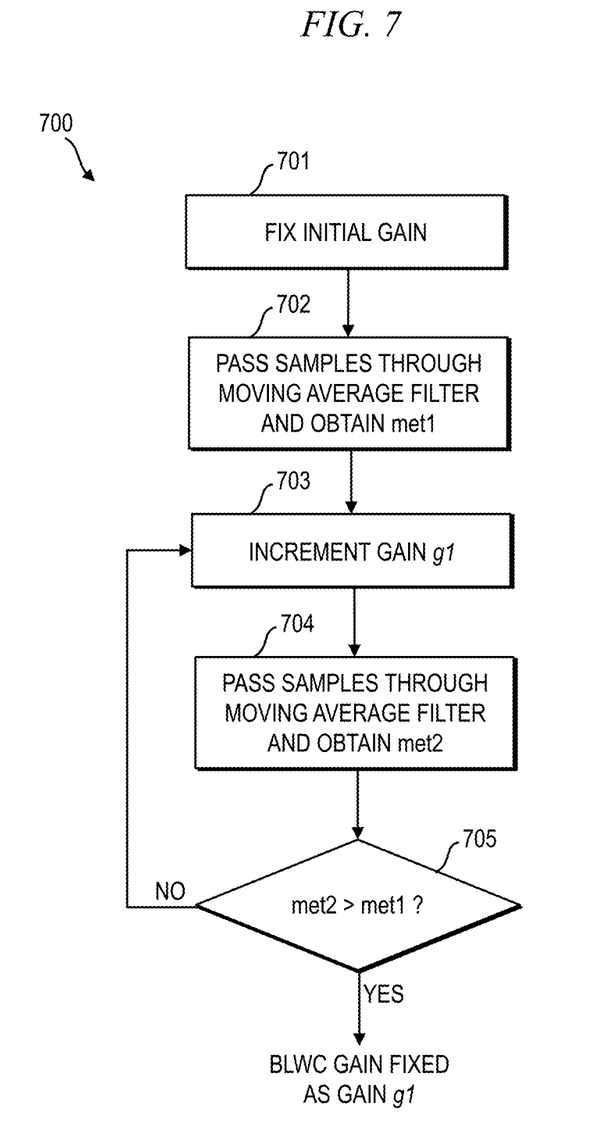
FIG. 7 depicts a method for linear search until the gain value minimizes the metric in accordance with one or more embodiments of the present invention.

In FIG. 7, a method 700 is shown that is based on linear search until the gain value that minimizes the metric. At block 701, the initial gain is fixed as g1=$g_{min}$ for a block of data of length M. According to one or more embodiments of the present invention, M is 4096 symbols or 8192 symbols, whereby at large values (e.g., 4096 or 8192 symbols) of M the predicted BLW gain approaches the actual BLW gain. At block 702, either error samples or transition samples are passed through the moving average filter (for example, having a length of 128, 256 or 512 bits) and the absolute sum of these output samples is taken. This absolute value is assigned to met1. At block 703, the gain is increased to the next gain value M. This gain is denoted as g2. At block 704, either error samples or transition samples are passed through the moving average filter and the absolute sum of these output samples is taken. This absolute value is assigned to met2. At block 705, if met2 is greater than met1, the processing stops and the BLWC (BLW compensation) gain is fixed as g1. Otherwise, met1=met2, and g1=g2. The method continues by returning to block 703.

In some protocols, transmitter settings change over time and the dc gain also changes over time accordingly. In such cases, the method of FIG. 7 is activated periodically, according to one or more embodiments. Because of BLW distortion in the input signal, a slowly varying offset is embedded in the signal. The moving average filter filters the slowly varying signal from the error samples or transition samples. When the BLW gain is matched to the dc gain of the system up to the receiver input, the absolute value of the moving average filter would attain a minimum value. The search method of FIG. 7 can also be implemented using a binary search algorithm.

Figure 8:
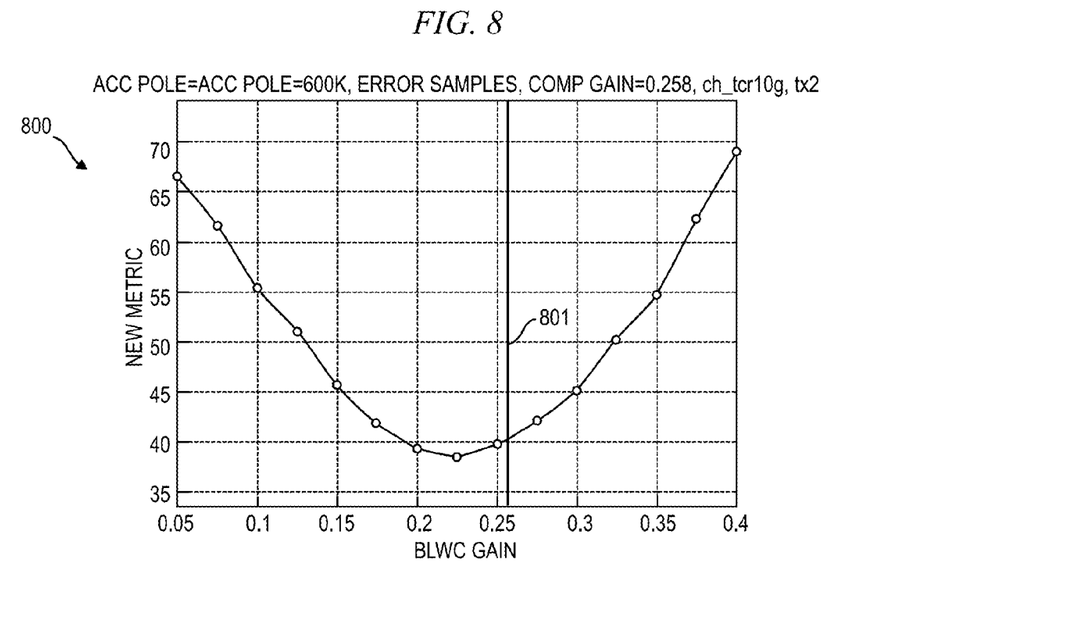
FIG. 8 illustrates a profile for BLW gain vs. a metric for adaptation of baseline wander (BLW) gain in accordance with one or more embodiments of the present invention.

In one exemplary implementation in which the transmitter dc gain=0.3 and channel dc gain=0.86 the BLW gain is approximately 0.26 based on the transmitter dc gain and the channel dc gain. As shown in the plot 800 of FIG. 8, the metric is minimized at a gain value of approximately 0.26 (at 801). This metric is determined using error samples by using moving average filter length of 512.

EXAMPLE 2

TX dc Gain=0.20 and Channel dc Gain=0.86

Figure 9:
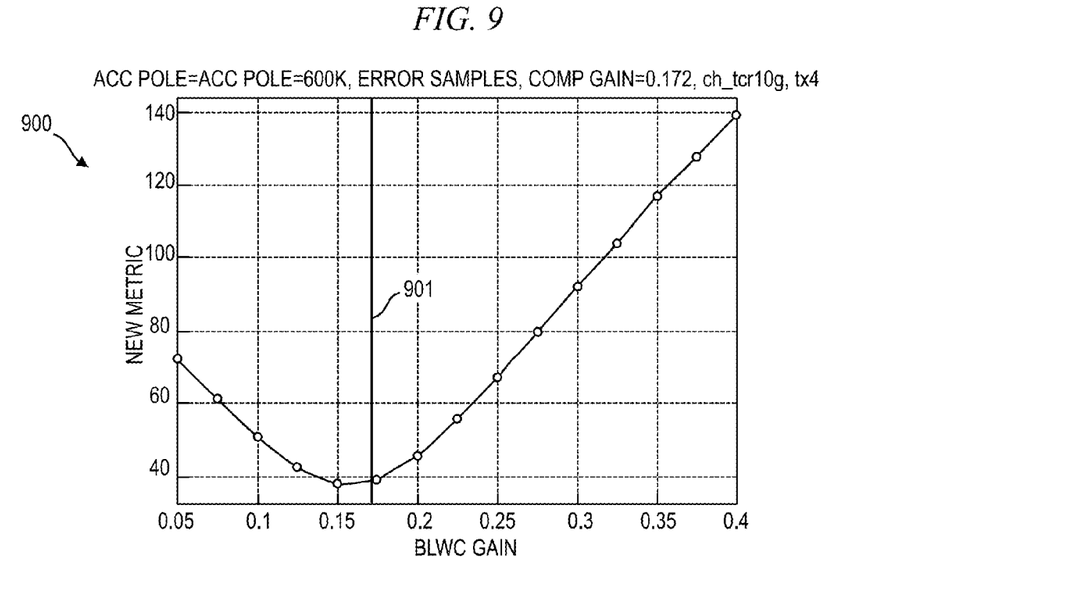
FIG. 9 illustrates a profile for BLW gain vs. a metric for adaptation of baseline wander (BLW) gain in accordance with one or more embodiments of the present invention.

In this case, the BLW gain is approximately 0.172 based on transmitter dc gain and channel dc gain. As shown in plot 900 of FIG. 9, the metric is minimized at a gain value of approximately 0.175 (at 901). This metric is determined, according to one or more embodiments, using error samples by using a moving average filter length of 512, although embodiments of the invention are not limited to any specific filter length.

As will be appreciated by those skilled in the art, embodiments of the present invention may be implemented as an apparatus, system, method and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to as a "circuit," "module" or "system." Furthermore, embodiments of the present invention may take the form of a computer program product embodied in one or more non-transitory machine-readable medium(s) having machine-readable program code embodied thereon.

The block diagrams in the figures depict illustrative architectures, functionality, and operation of implementations of systems, methods and computer program products according to embodiments of the present invention. In this regard, each block shown in the block diagrams may represent a module, segment, or portion of code, which comprises one or more executable instructions for implementing specified functions. It should also be noted that, in one or more embodiments, functions represented by the blocks may occur out of the order noted in the figures. For example, two blocks shown in succession may, in fact, be executed substantially concurrently, or the blocks may sometimes be executed in the reverse order, depending upon the functionality involved. It will also be appreciated that each block of the block diagrams, and combinations of blocks in the block diagrams, can be implemented by special purpose hardware-based systems that perform the specified functions or acts, or combinations of special purpose hardware and computer instructions.

It should be understood that any of the methods described herein can include an additional step of providing a system comprising distinct software modules embodied on a non-transient computer-readable storage medium; the modules include, in one or more embodiments, any or all of the elements depicted in the block diagrams and/or described herein; by way of example and not limitation, a method for adaptation of BLW gain executed by a receiver disposed in a SerDes system (see FIG. 1), the method comprising receiving, by a coupled capacitor (e.g., 104), a serial input signal from a transmitter (101) operatively coupled with the receiver via a communication channel (102) established therebetween, outputting, by the coupled capacitor, a capacitance output signal, and subtracting a BLW gain from the capacitance output signal output by the coupled capacitor prior to inputting the capacitance output signal to an equalizer (105).

The method steps can be carried out using the distinct software modules and/or sub-modules of the system, executing on one or more hardware processors. Further, a computer program product can include a computer-readable storage medium with code adapted to be implemented to carry out one or more method steps described herein, including the provision of the system with the distinct software modules.

In any case, it should be understood that the components illustrated herein may be implemented in various forms of hardware, software, or combinations thereof; for example, application specific integrated circuit(s) (ASICS), functional circuitry, one or more appropriately programmed general purpose digital computers with associated memory, and the like. Given the teachings of the invention provided herein, one of ordinary skill in the related art will be able to contemplate other implementations of the components of the invention.

In an integrated circuit implementation of one or more embodiments of the invention, multiple identical die are typically fabricated in a repeated pattern on a surface of a semiconductor wafer. Each such die may include a device described herein, and may include other structures and/or circuits. The individual dies are cut or diced from the wafer, then packaged as integrated circuits. One skilled in the art would know how to dice wafers and package die to produce integrated circuits. Any of the exemplary circuits illustrated in the accompanying figures, or portions thereof, may be part of an integrated circuit. Integrated circuits so manufactured are considered part of this invention.

The illustrations of embodiments of the invention described herein are intended to provide a general understanding of the structure of various embodiments, and they are not intended to serve as a complete description of all the elements and features of apparatus and systems that might make use of the structures described herein. Many other embodiments will become apparent to those skilled in the art given the teachings herein; other embodiments are utilized and derived therefrom, such that structural and logical substitutions and changes can be made without departing from the scope of this disclosure. The drawings are also merely representational and are not drawn to scale. Accordingly, the specification and drawings are to be regarded in an illustrative rather than a restrictive sense.

Embodiments of the invention are referred to herein, individually and/or collectively, by the term "embodiment" merely for convenience and without intending to limit the scope of this application to any single embodiment or inventive concept if more than one is, in fact, shown. Thus, although specific embodiments have been illustrated and described herein, it should be understood that an arrangement achieving the same purpose can be substituted for the specific embodiment(s) shown; that is, this disclosure is intended to cover any and all adaptations or variations of various embodiments. Combinations of the above embodiments, and other embodiments not specifically described herein, will become apparent to those of skill in the art given the teachings herein.

The abstract is provided to comply with 37 C.F.R. §1.72(b), which requires an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the appended claims reflect, inventive subject matter lies in less than all features of a single embodiment. Thus the following claims are hereby incorporated into the Detailed Description, with each claim standing on its own as separately claimed subject matter.

Given the teachings of embodiments of the invention provided herein, one of ordinary skill in the art will be able to contemplate other implementations and applications of the techniques of embodiments of the invention. Although illustrative embodiments of the invention have been described herein with reference to the accompanying drawings, it is to be understood that embodiments of the invention are not limited to those precise embodiments, and that various other changes and modifications are made therein by one skilled in the art without departing from the scope of the appended claims.

What is claimed is:

1. A receiver disposed in a serializer/deserializer (Ser Des) system, the receiver comprising:
   a coupling capacitor configured to receive a serial input signal from a transmitter operatively coupled with the receiver via a communication channel established therebetween and to output a capacitance output signal;
   an equalizer configured to receive a signal comprising the capacitance output signal having a baseline wander gain subtracted therefrom, and to output an equalized signal;
   a running disparity generator receiving decoded symbols and generating a running disparity signal; and
   a low-pass filter receiving the running disparity signal and outputting the baseline wander gain, wherein the coupling capacitor is part of an on-chip alternating current coupling capacitance that causes a high-pass filter to be applied to the received serial input signal and wherein a cut-off frequency of the low-pass filter is equal to that of the high-pass filter at least due to the on-chip alternating current coupling capacitance.

2. The receiver of claim 1, further comprising a slicer receiving the equalized signal from the equalizer and outputting the decoded symbols.

3. The receiver of claim 2, wherein the baseline wander gain is generated using the decoded symbols and a direct current (dc) gain of the receiver up to that of the serial input signal.

4. The receiver of claim 2, wherein the slicer is configured to quantize the equalized signal.

5. The receiver of claim 2, wherein the slicer is configured to output a transition sample.

6. The receiver of claim 5, wherein the transition sample comprises sampled values of the capacitance output signal at transitions.

7. The receiver of claim 1, further comprising an adaptation loop receiving the decoded symbols and outputting a target value for the capacitance output signal.

8. A method for adaptation of baseline wander gain executed by a receiver disposed in a serializer/deserializer (SerDes) system, the method comprising:
   receiving, by a coupled capacitor, a serial input signal from a transmitter operatively coupled with the receiver via a communication channel established therebetween;
   outputting, by the coupled capacitor, a capacitance output signal;
   subtracting a baseline wander gain from the capacitance output signal output by the coupled capacitor prior to inputting the capacitance output signal to an equalizer;
   generating a running disparity signal with a running disparity generator that is receiving decoded symbols; and
   applying a low-pass filter to the running disparity signal to obtain the baseline wander gain, wherein the coupled capacitor is part of an on-chip alternating current coupling capacitance that causes a high-pass filter to be applied to the received serial input signal and wherein a cut-off frequency of the low-pass filter is equal to that of the high-pass filter leas due to the on-chip alternating current coupling capacitance.

9. The method of claim 8, further comprising determining an equalized signal given the capacitance output signal having the baseline wander gain subtracted therefrom.

10. The method of claim 9, further comprising quantizing the equalized signal.

11. The method of claim 8, further comprising:
    determining the baseline wander gain as a function of the running disparity signal.

12. The method of claim 11, further comprising receiving an equalized signal from the equalizer and outputting the decoded symbols.

13. The method of claim 11, wherein the baseline wander gain is generated using the decoded symbols and a direct current (dc) gain of the receiver up to that of the serial input signal.

14. The method of claim 8, further comprising determining a target value for the capacitance output signal using decoded symbols.

15. A computer program product embodied in a non-transitory machine-readable medium having machine-readable program code embodied thereon for performing a method of adaptation of baseline wander gain, the method comprising:
    receiving a serial input signal;
    outputting a capacitance output signal using the serial input signal;
    subtracting a baseline wander gain from the capacitance output signal prior to inputting the capacitance output signal to an equalizer;
    generating a running disparity signal using decoded symbols; and
    applying a low-pass filter to the running disparity signal to obtain the baseline wander gain, wherein the coupled capacitor is part of an on-chip alternating current coupling capacitance that causes a high-pass filter to be applied to the received serial input signal and wherein a cut-off frequency of the low-pass filter is equal to that of the high-pass filter at least due to the on-chip alternating current coupling capacitance.

16. The computer program product of claim 15, further comprising determining an equalized signal given the capacitance output signal having the baseline wander gain subtracted therefrom.

17. The computer program product of claim 15, further comprising:
    determining the baseline wander gain as a function of the running disparity signal.

18. The computer program product of claim 17, further comprising receiving an equalized signal from the equalizer and outputting the decoded symbols.

19. The computer program product of claim 17, wherein the baseline wander gain is generated using the decoded symbols and a direct current (dc) gain of the receiver up to that of the serial input signal.

20. The computer program product of claim 15, further comprising determining a target value for the capacitance output signal using decoded symbols.

* * * * *